United States Patent Office 2,756,252
Patented July 24, 1956

2,756,252
ADDUCTS OF SUBSTITUTED PHOSPHORYL AMIDES

Art C. McKinnis, Long Beach, Calif., assignor to Union Oil Company of California, Los Angeles, Calif., a corporation of California No Drawing. Application July 28, 1952,
Serial No. 301,385

9 Claims. (Cl. 260—501)

This invention relates to a new class of chemical compounds which may be designated as adducts of hydrocarbon substituted phosphoryl amides, and to new uses for compounds. More particularly the adducts are compounds formed by hydrogen bonding between a hydrocarbon substituted phosphoryl amide, which may be termed the hydrogen bonding agent, and another organic component which may be termed the hydrogen donor. These compounds in general are useful for a wide variety of purposes, for example as insecticides, pasticizers, germicides, chemical intermediates, solvents. They may also be utilized to aid in separating and identifying organic compounds containing one or more groups capable of forming a hydrogen bond with an electro-negative atom such as oxygen or nitrogen.

Compounds formed by hydrogen bonding are in general well recognized in the chemical literature. Such compounds are discussed, for example in "The Nature of the Chemical Bond" by Linus Pauling, Cornell University Press, 1940, pages 284 to 334. The known types of hydrogen bonding may be divided roughly into two classes: inter-molecular and intra-molecular. Alcohols exemplify those compounds which show a strong tendency toward inter-molecular hydrogen bonding to form loosely bonded polymers, as shown by the following formula:

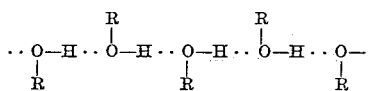

Dicarboxylic acids such as terephthalic acid are also capable of forming long polymeric molecules by intermolecular hydrogen bonding, resulting in abnormally high melting and boiling points. Ortho-nitro-phenol, however, is a prime example of a compound which forms strong intra-molecular hydrogen bonds as shown by the following formula:

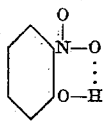

It is in general characteristic of the polymers formed by inter-molecular hydrogen bonding that discreet polymers having a given molecular weight cannot be isolated in pure form due to the weak nature of the hydrogen bond, and the resulting formation of mixtures of highly polymerized and less polymerized molecules in equilibrium with molecules wherein no hydrogen bonding is present.

The present invention is based upon the discovery that the hydrogen bonding agents consisting of the substituted phosphoryl amides are capable of forming stronger hydrogen bonds with all known types of hydrogen donors than has been known in the past. These particular hydrogen bonding agents may be designated by the following general formula:

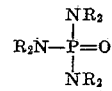

wherein each R represents the same or different alkyl, aryl or cycloalkyl groups. The alkyl amido groups attached to the phosphorus atom exhibit an exceptionally strong electron donating tendency which renders the phosphorus atom highly negative. The highly negative phosphorus atom in turn repels electrons toward the oxygen atom, with the result that the oxygen atom is highly negative, and has an exceptionally strong tendency to form hydrogen bonds with hydrogen donors.

The compounds formed between these hydrogen bonding agents and the hydrogen donor may be designated by the following general formula:

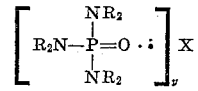

wherein X represents the hydrogen-donor compound containing $y$ hydrogen bond-forming groups, and $y$ is one or more. The hydrogen bond-forming groups in X are selected from the class consisting of hydroxyl (HO—), carboxyl (HOOC—), amine ($H_2N$—), hydrogen polychlorocarbon groups ($HCCl_2R$; $HCCl_3$), and acetylenic groups ($HC\equiv C$—). The adducts may be formed in general by simply mixing the phosphoryl amide with the required molar proportion of the hydrogen donor compound, and they may be purified by washing or recrystallization from relatively non-polar solvents such as acetone, benzene, toluene, xylene, etc.

A preferred class of hydrogen bonding agents consists of the hexa-alkyl phosphoryl amides, and particularly the lower alkyl amides, i. e. those wherein the alkyl groups contain from 1 to 8 carbon atoms. Some of these compounds are new in themselves and a general method for their preparation will hence be described. According to one possible method they may be obtained by reaction between a phosphorus oxyhalide, e. g., phosphorus oxychloride or phosphorus oxybromide, with a dialkylamine, e. g. dimethylamine, diethylamine, methylethylamine, etc. The reaction occurs readily in the absence of catalysts and at ordinary or only moderately elevated temperatures. An excess of the dialkylamine reactant is usually employed to promote the formation of a maximum quantity of the tri-substituted halogen-free compound, and also to fix in the form of a dialkylamine hydrohalide salt the hydrogen halide which is evolved from the reaction. If desired, a reaction solvent such as benzene, toluene, acetone, etc. may be employed. The reaction is conveniently carried out simply by gradually adding the dialkylamine reactant to the phosphorus oxyhalide while allowing the heat of reaction to provide a moderate increase in temperature. Upon completion of the addition of the dialkylamine reactant, the temperature is usually increased to about 100°–200° C. for a short period of time to insure completion of the reaction, after which the crude reaction product may be fractionally distilled to recover first any excess free dialkylamine, and then the hexa-alkyl phosphoryl amide product in substantially pure form. A quantity of dialkylamine equal to that which has reacted with the phosphorus oxyhalide is obtained as distillation bottoms in the form of a hydrohalide salt, and, if desired, may be recovered by adding an aqueous alkali in distilling.

The following example will illustrate the preparation of one of the hexa-alkyl phosphoryl amides of the present class, but is not to be construed as limiting the invention.

*Example I*

Gaseous dimethylamine is passed into 154 parts by weight of phosphorus oxychloride at a rate of about 45 liters/hr. over a period of about 3 hours, after which time no further quantity of the amine is absorbed by the phosphorus oxychloride. Approximately 275 parts by weight of the amine are consumed in this manner. During the addition of the amine reactant the temperature of the reaction mixture rises from about 20° C. to about 170° C., over a period of about 2 hours after which the reaction temperature is maintained at about 160° C. by immersing the reaction vessel in an oil bath. Upon completion of the reaction the crude reaction product is transferred to a distillation column and is fractionally distilled under vacuum. The hexamethyl phosphoryl amide product is obtained as a water-white mobile liquid distilling at about 69°–71° C. under 1 mm. pressure. It has a specific gravity of about 1.03 at 20° C., and a viscosity of 3.4 cps. at 25° C. Other hexa-alkyl phosphoryl amides of the present class may be prepared employing analogous procedures. Those skilled in the art will readily understand also that the aryl- or cyclo-alkyl phosphoryl amides may also be prepared by substituting the appropriate di-arylamine or dinaphthenyl amine for the dimethylamine in the above example. Any other suitable method may be employed for preparing any of the above compounds.

The hydrogen donors which may be combined with the phosphoryl amides by hydrogen bonding include in general any organic compound containing one or more groups which are capable of donating a proton to form a hydrogen bond. Such compounds include aliphatic and naphthenic alcohols, aliphatic, naphthenic and aromatic amines, phenols, aliphatic, naphthenic and aromatic carboxylic acids, acetylenic compounds, and compounds containing a hydrogen atom bonded to a carbon atom to which is bonded at least two chlorine atoms. Specific examples of such compounds include methanol, ethanol, propanol, isopropanol, butanol, cyclohexanol, and the higher alcohols; ethylene glycol, propylene glycol, glycerol, diethylene glycol and polyalkylene glycols in general; hydroquinone, resorcinol, catechol, phenol, o-, m- and p-cresol, thymol, alpha- and beta-naphthol, pyrogallol, guaiacol, phloroglucinol, salicylaldehyde, methyl salicylate, terephthalic acid, isophthalic acid, phthalic acid, salicylic acid, benzoic acid, acetic acid, lauric acid, adipic acid, lactic acid, citric acid, acrylic acid, glycine, hexahydrobenzoic acid, o-, m-, and p-toluic acids, nicotinic acid, isonicotinic acid, para-aminobenzoic acid, aniline, benzidine, cyclohexyl amine, ethylene diamine, hexamethylene diamine, o-, m-, and p-toluidine, chloroform, pentachloroethane, phenyl acetylene.

As has been previously indicated, the adducts of this invention may be prepared by simply admixing the phosphoryl amide with the desired molar proportion of the hydrogen donor. The reaction may be conducted preferably at room temperature, but lower or higher temperatures may also be employed. If the hydrogen donor employed is one which in itself forms strong intermolecular hydrogen bonds, for example terephthalic acid or isonicotinic acid, the resulting adduct with the phosphoryl amide will exhibit a considerably lower melting point than the original hydrogen donor. The adducts formed with non-polymeric hydrogen donors may not exhibit a lowered melting point. Any of the adducts formed herein may be purified by such conventional methods as distilling off excess phosphoryl amide or hydrogen donor, or by washing or recrystallization with non-polar solvents. The adducts are found to exhibit distinct and sharp melting points, and generally assume definite crystalline forms. Frequently, the adducts exhibit greatly increased solubilities in the various non-polar solvents as compared to the parent hydrogen donor. In cases wherein the hydrogen donor and/or the phosphoryl amide are solids at ordinary temperatures, the adduct formation may be conducted in a non-polar solvent phase such as in benzene or acetone. It is found that in all cases the oxygen atom of the phosphoryl amide is so strongly electro-negative that any hydrogen bonding originally present in the hydrogen donor is disrupted in favor of hydrogen bonding with the phosphoryl amide. Therefore the adducts obtained are found to contain one mol of phosphoryl amide for each mol of hydrogen-donating group. This definite combining ratio indicates the strength of the hydrogen bond or bonds which are formed.

The following examples will illustrate the preparation of several representative adducts of the present class. These examples should not, however, be construed as limiting the invention:

*Example II*

About 358 grams of hexamethyl phosphoryl amide is heated to about 150° C. and 166 grams of terephthalic acid is added with stirring and continued heating. The temperature is maintained at about 150° C. for a few minutes and the mixture is then allowed to cool whereupon a solid mass of crystals is formed. The crystals are dissolved in about 300 ml. of boiling acetone. Upon cooling a second crop of crystals is formed which is recovered by filtration. The recrystallized adduct is then washed with cold acetone and dried in a current of air. Large, colorless crystals are obtained melting at 128° C. Analysis indicates a product corresponding to the formula:

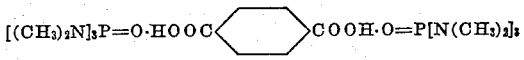

*Example III*

By substituting isophthalic acid for the terephthalic acid of Example II, and carrying out the adduct-forming reaction at 50° C., a similar appearing crystalline adduct is obtained melting at 52° C. and corresponding to the formula:

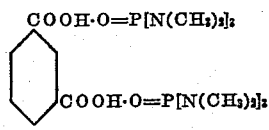

*Example IV*

By substituting phthalic acid for the terephthalic acid of Example I, and carrying out the adduct-forming reaction at 80° C., a similar appearing crystalline adduct is obtained melting at 70° C. and corresponding to the formula:

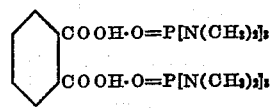

*Example V*

About 110 grams of hydroquinone is dissolved in 300 ml. of benzene, and 358 grams of hexamethyl phosphoryl amide is added slowly with stirring at room temperature. A slight warming of the mixture is noted. About half of the benzene is removed by distillation and the mixture is cooled whereupon a crystalline phase is formed. The crystals are removed by filtration and washed with a small amount of cold benzene. Upon drying at 100° C. in a stream of air, large, colorless crystals are obtained melting at 152° C., and corresponding to the formula:

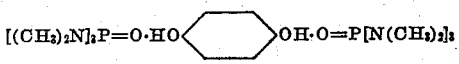

*Example VI*

About 62 grams of ethylene glycol is mixed at room temperature with 358 grams of hexamethyl phosphoryl amide. Upon cooling the mixture, a mass of colorless crystals is obtained which melt at —20° C. and correspond to the formula:

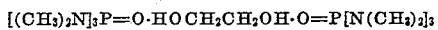
[(CH₃)₂N]₃P=O·HOCH₂CH₂OH·O=P[N(CH₃)₂]₃

Example VII

About 122 grams of benzoic acid is dissolved slowly at room temperature in 179 grams of hexamethyl phosphoryl amide. Upon cooling the mixture a mass of colorless crystals is obtained melting at 10° C., and corresponding to the formula:

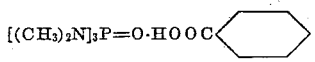
[(CH₃)₂N]₃P=O·HOOC⟨⟩

Example VIII

By substituting an equivalent amount of benzidine for the terephthalic acid of Example I a colorless crystalline adduct of benzidine and hexamethyl phosphoryl amide is obtained melting at 132° C.

Example IX

By substituting an equivalent amount of aniline for the benzoic acid of Example VII a colorless, crystalline adduct of aniline and hexamethyl phosphoryl amide is obtained melting below 0° C.

By substituting other alkyl, aryl or cycloalkyl phosphoryl amides fo rthe hexamethyl phosphoryl amide employed in the above examples, analogous compounds are obtained showing in general the expected gradations in physical properties with increasing molecular weight. Also, any of the above described hydrogen-donating compounds may be substituted in molar equivalent quantities for the particular acids, phenols, alcohols and amines disclosed in the examples.

A preferred class of adducts consists of those formed between the lower alkyl phosphoryl amides and aromatic hydroxyl-containing hydrogen donors. The term "hydroxyl-containing hydrogen donors" is intended to include primarily aromatic carboxylic acids and phenols. These materials form particularly strong hydrogen bonds with the phosphoryl amides, and are hence exceptionally stable. They are useful in a wide variety of applications. The phenolic adducts form useful germicides and antiseptics. All are useful intermediates for preparing functional derivatives of the hydrogen-donor such as esters, ethers, etc., and for separating difficulty separable mixtures of organic compounds.

Many mixtures of difficulty separable organic compounds may be readily separated by utilizing the ability of one or more of the components thereof to form adducts as herein described, and subsequently employing chemical or physical methods for separating the adducts from each other, or the adducts from the non-adducts. One type of mixture which may be so separated consists of mixtures of chemically dissimilar compounds which differ in their ability to form the herein described adducts. As an example of such a mixture may be cited the gaseous mixtures obtained by the pyrolysis or partial oxidation of hydrocarbons at high temperatures, and containing acetylene, carbon monoxide, carbon dioxide, hydrogen, nitrogen, ethylene and other hydrocarbons. In this case the separation is obtained by scrubbing the gaseous mixture with any of the phosphoryl amides herein disclosed, whereupon the acetylene selectively forms an adduct with the phosphoryl amide which is soluble therein, and the other components of the mixture fail to form such adducts. The dissolved acetylene adduct may then be decomposed as by heating and the liberated acetylene recovered.

Another type of mixture which may be resolved consists of chemically and physically similar compounds such as isomeric carboxylic acids or phenols. The components of these mixtures may exhibit approximately equal capacities for forming the herein described adducts, but the adducts may be separated by various methods. For example, mixtures consisting essentially of terephthalic and isophthalic acids obtained by the oxidation of isomeric xylene mixtures may be separated by first forming the phosphoryl amide adducts of the components, and then separating the adducts by fractional crystallization or by solvent extraction, or both. Fractional crystallization and solvent extraction are not economically effective for separating the acids themselves since they sublime before melting and are at most only slightly soluble in known solvents e. g. acetone, alcohol, ether, benzene. However, the terephthalic acid adducts described herein melt at considerably higher temperatures than the corresponding isophthalic adducts (cf. Examples I and II), and the two may hence be readily separated by fractional crystallization.

Moreover, the isophthalic acid adducts are more soluble in an excess of the phosphoryl amide at any given temperature than the corresponding terephthalic acid adducts. An effective separation of the adducts may hence be achieved by solvent extraction of the solid acid mixture with excess phosphoryl amide adduct-former, or by fractional crystallization from a solution of the mixed adducts in the phosphoryl amide. In the former case, the isophthalic acid adduct is selectively dissolved leaving a solid residue enriched in terephthalic acid adduct; in the latter case the terephthalic acid adduct is preferentially precipitated from solution by chilling or vacuum concentration of a solution of the mixed acid adducts. In either case the recovered terephthalic acid adduct may be decomposed with a stronger hydrogen donor such as water or methanol to yield the pure acid and a water or methanol adduct of the phosphoryl amide. The phosphoryl amide may then be regenerated by heating to drive off the water or methanol. Similarly, water or methanol may be added to the residual phosphoryl amide solution of isophthalic acid adduct, thereby precipitating isophthalic acid which may then be recovered by filtration.

The above methods for recovering the acids from their adducts by adding a stronger hydrogen donor may be characterized generally as adduct-metathesis, as shown by the following general equation:

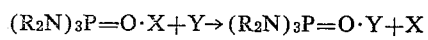
(R₂N)₃P=O·X+Y→(R₂N)₃P=O·Y+X

This general reaction may be utilized to separate the adduct mixtures in cases where Y in the above equation is intermediate in strength as a hydrogen donor between, for example X and X₁ components of a mixture to be separated. This condition exists for example in the case of isophthalic-terephthalic adduct mixtures. The isophthalic acid may be displaced from its adducts by water, but not by methanol, while terephthalic acid is displaced by either water or methanol. This adduct mixture may hence be treated with methanol to precipitate predominantly terephthalic acid, and then with water to precipitate isophthalic acid. Substantially any mixture of adducts containing X and X₁ as hydrogen donors may be resolved by proper selection of other hydrogen donors Y of intermediate hydrogen-donating tendencies between X and X₁. Y may for example be any of the hydrogen donor compounds heretofore listed.

In a manner analogous to the above described procedures, other isomeric mixtures, or mixtures of chemically similar compounds may be resolved into their components. Examples of such mixtures include nicotinic and isonicotinic acids, alpha- and beta-naphthol, meta- and para-cresol, vinyl-acetylene and butadiene, phenyl-acetylene and styrene, ortho- and meta-toluic acids, ortho-, meta- and para-toluidine, etc.

From the foregoing it will be seen that the compounds described herein comprise a highly novel and useful class of materials. This description should not however be considered as limiting, since many variations may be made by those skilled in the art without departing from the scope or spirit of the following claims.

I claim:
1. A stable, chemically discrete adduct composed of (1) one mole of an aromatic compound nuclearly substituted by at least one but not more than two hydrogen-donor functional groups selected from the class consisting of hydroxyl and carboxyl groups, and (2) one mole of adducted hexamethyl phosphoryl amide for each mole of said hydrogen-donor functional groups.
2. An adduct as defined in claim 1 wherein said hydrogen-donor functional groups are carboxyl groups.
3. An adduct as defined in claim 1 wherein said hydrogen-donor functional groups are hydroxyl groups.
4. A stable, chemically discrete adduct composed of one mole of a benzene diol and two moles of adducted hexamethyl phosphoryl amide.
5. A stable, chemically discrete adduct of hexamethyl phosphoryl amide and terephthalic acid having the formula:

6. A stable, chemically discrete adduct of hexamethyl phosphoryl amide and isophthalic acid having the formula:

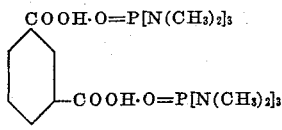

7. A stable, chemically discrete adduct of hexamethyl phosphoryl amide and phthalic acid having the formula:

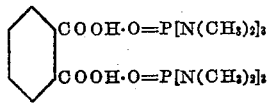

8. A stable, chemically discrete adduct of hexamethyl phosphoryl amide and benzoic acid having the formula:

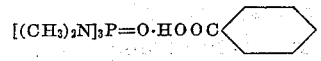

9. A stable, chemically discrete adduct of hexamethyl phosphoryl amide and hydroquinone having the formula:

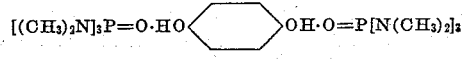

References Cited in the file of this patent
UNITED STATES PATENTS

| | | |
|---|---|---|
| 2,102,103 | Urbain et al. | Dec. 4, 1937 |
| 2,164,584 | Lyrkin | Feb. 7, 1939 |
| 2,151,380 | Flint et al. | Mar. 21, 1939 |
| 2,160,841 | Dreyfus | June 6, 1939 |
| 2,587,464 | Ham | Feb. 26, 1952 |
| 2,596,344 | Newet et al. | May 13, 1952 |
| 2,603,660 | Heider | July 15, 1952 |
| 2,623,611 | Levine | Dec. 30, 1952 |
| 2,634,823 | Drake | Apr. 14, 1953 |

OTHER REFERENCES

Audrieth et al.: J. Am. Chem. Soc., vol. 64 pp. 1553–5 (1942).

Kosolapoff: Organo-Phosphorus Compounds, Wiley (1950), p. 299.